United States Patent Office 3,280,429
Patented Oct. 25, 1966

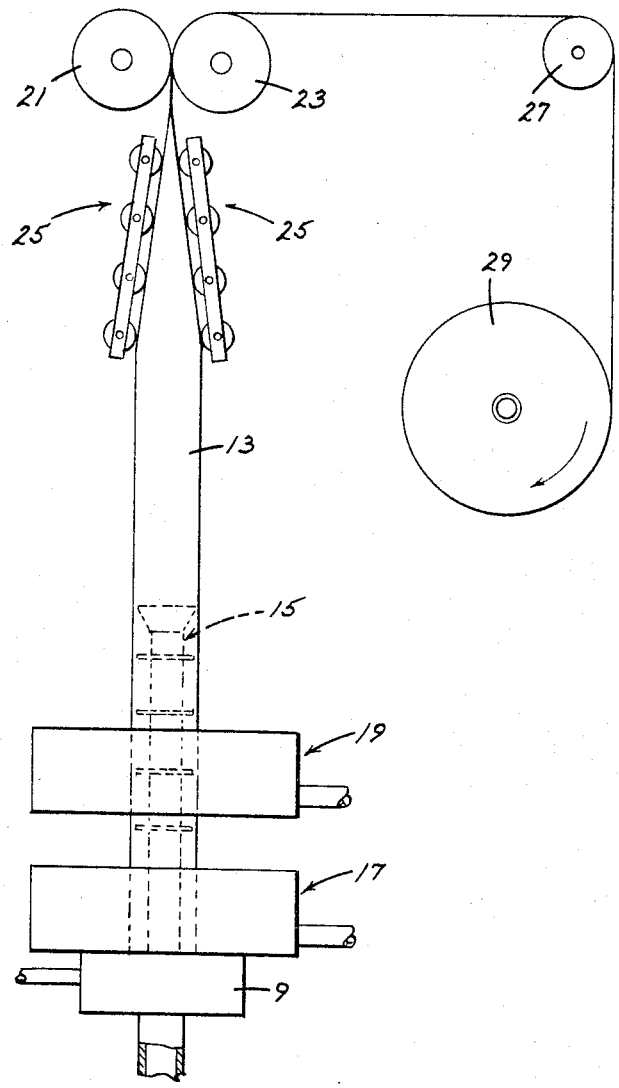

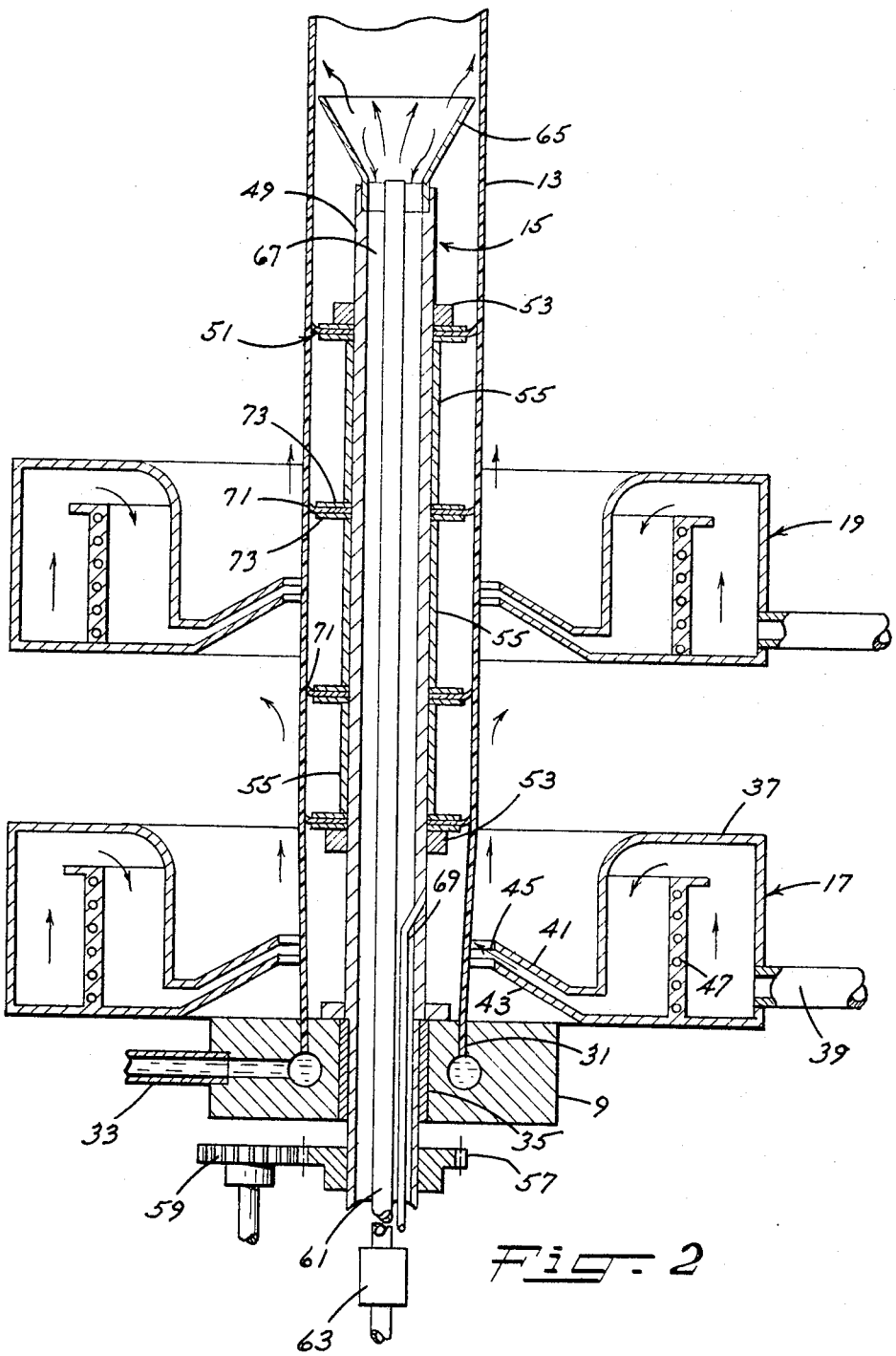

3,280,429
APPARATUS FOR MAKING TUBING
Harold A. Haley, Glenolden, Pa., assignor, by mesne assignments, to FMC Corporation, San Jose, Calif., a corporation of Delaware
Filed Oct. 1, 1962, Ser. No. 227,234
20 Claims. (Cl. 18—14)

This invention relates to the manufacture of thermoplastic tubing, and more particularly to an improved apparatus for producing continuous seamless tubing from molten thermoplastic materials.

In one method of manufacturing tubing, a molten thermoplastic material is extruded through an annular die to form a seamless tubing which is drawn from the die by wind-up rolls driven at a speed sufficient to stretch the tubing while it is in a formative plastic state. Between the point of extrusion and the wind-up rolls the tubing is inflated to a predetermined diameter by means of air or other gaseous medium to form an isolated gaseous bubble confined between the extrusion die and the nip of the wind-up rolls. Setting of the inflated thermoplastic tubing is achieved by directing a controlled flow of air on and around the tubing.

With production speeds of less than about 30 feet per minute, comparatively little variation is apparent in the lay-flat dimension of the resulting collapsed tubing. Aside from the standpoint of cost, production at such slow speeds often involves degradation of the thermoplastic material as a result of its slower travel through the extruding means and thus entails greater waste and downtime of the apparatus.

In another procedure, a freshly extruded tubing of thermoplastic material is drawn over a metallic temperature modifying former of predetermined diameter while the tubing is still in the formative, plastic state. It has been found, however, that the metallic temperature modifying former tends to adhere with or grab the hot extruded tubing, thus rupturing the tubing or otherwise interrupting the extrusion process.

An added disadvantage of the above-noted procedures and equipment, as well as other known systems for making tubing, is that the resulting tubing exhibits thick and thin bands or longitudinally extending elements which differ in thickness. Such differences in thickness along the tubing wall are generally attributed to one or a combination of such factors such as, temperature or pressure differentials around the annular die, deposits of foreign material within the die, improper die construction or adjustment, or non-uniform cooling of the extruded tubing. Generally, the differences in thickness between such elements of the tubing wall are minute but become quite evident when laid upon themselves numerous times. It will be apparent, that when wound in roll form each added layer of such tubing is deformed more than the previous layer and soon reaches undesirable proportions. Furthermore, such deformation of the wound tubing becomes set after a relatively short storage period, and not only renders the tubing difficult to print but also unsuitable as a package wrapping material. Accordingly, a primary object of this invention is to provide a new or generally improved and more satisfactory apparatus for manufacturing thin-walled plastic tubing.

Another object is the provision of an apparatus for manufacturing a thin-wall tubing having substantially the same lay-flat dimension along its entire length.

Still another object is to provide an improved and simplified apparatus for powdering the internal surface of thermoplastic tubing during the formation thereof so as to prevent the same from adhering when the tubing is collapsed and wound upon itself.

A further object is the provision of an improved apparatus for forming thin-walled plastic tubing and collecting the same as a roll, with elements of the tubing wall which differ in thickness being laterally offset from each other in adjacent layers of the wound tubing.

Still further objects will appear from the following description.

These objects are accomplished in accordance with the present invention by an apparatus in which a freshly extruded seamless tubing formed of thermoplastic material is expanded to and maintained at a desired diameter by being drawn over a mandrel while the tubing is still in a comparatively plastic or formative condition. The mandrel includes a supporting conduit which extends through and projects beyond the tubing extrusion die, and a plurality of disc assemblies fixed to the supporting conduit at spaced intervals. The disc assemblies each includes a pair of annular metallic plates which are slightly smaller in diameter than the desired internal diameter of the tubing being formed, and a sheet or fabric piece which is interposed between the metallic plates and projects beyond the peripheral edges thereof.

A second conduit is disposed within the mandrel supporting conduit and serves to deliver gas suspended powders into and against the internal surface of the tubing as it travels beyond the last of the mandrel disc assemblies. The two conduits are saced from each other so that excess powder may be removed through the passage provided therebetween.

In the preferred embodiment of the present invention, the mandrel is oscillated so as to impart a similar oscillating movement to the extruded tubing and thereby insure that the tubing, when subsequently collapsed, is flattened along fold lines which occur along successively different longitudinal elements of the tubing wall.

In the drawing,

FIGURE 1 is a diagrammatic illustration of the apparatus of the present invention in use; and FIGURE 2 is an enlarged sectional view of a portion of the apparatus shown in FIGURE 1.

With reference to the drawing, FIGURE 1 diagrammatically illustrates an annular die 9 from which a molten thermoplastic material may be continuously extruded as a seamless thin-walled tubing 13. The freshly extruded seamless tubing 13 is sized or expanded to a desired diameter as it is drawn over the periphery of a mandrel 15, and is cooled or set by air or other gaseous medium impinged against the outer surface of the tubing wall by air rings 17 and 19. A pair of nip rolls 21 and 23 serve to continuously withdraw the tubing 13 away from the point of extrusion and also maintain the tubing in a flattened condition after it has been collapsed by the cooperating frames 25. After leaving the nip rolls 21 and 23, the flattened tubing is passed over a guide roll 27 and is wound upon itself as a roll 29.

As shown on an enlarged scale in FIGURE 2, the die 9 includes an annular orifice 31, which is operatively connected to a conventional extruder by a conduit 33, and a central opening 35 through which extends the mandrel 15. The air rings 17 and 19 are of identical construction, each including a ring-shaped housing 37 into which a gaseous cooling medium is delivered by a conduit 39, walls 41 and 43 which project from the inner periphery of the housing 37 and together provide a distribution orifice 45, and an internal partition 47 within which cooling coils 48 are embedded for chilling the gaseous cooling medium as it travels within the housing.

The mandrel includes a central supporting conduit 49 and a plurality of disc assemblies 51 which are preferably fixed to the conduit 49 at longitudinally spaced intervals, as by clamp rings 53 and tubular spacers 55. A gear 57 is fixed to the mandrel supporting conduit 49 and meshes with a gear 59 driven by a conventional reversible motor, not shown, for oscillating the mandrel 15 periodically or continuously, as more fully described hereafter. To facilitate powdering or dusting of the internal surface of the extruded tubing, a mixture of suitable powder and air or other gaseous medium is delivered through the mandrel 15 by a conduit 61 which is connected to a suitable pump 63. Excess dusting powder is collected by a funnel 65 fixed to the end of the conduit 49 and are exhausted from within the tubing 13 through a passage 67 which exists between the conduits 49 and 61. Further, insofar as the thermoplastic material is still in a molten condition as it issues from the die 9, air or other gaseous medium is delivered by a pipe 69 into that portion of extruded tubing 13 which extends between the die 9 and the first of the series of disc assemblies 51 to thus enable the same to withstand the force of the cooling medium delivered by the cooling ring 17. It will be noted that the pipe 69 is disposed within and extends through the wall of the mandrel supporting conduit 49.

In operation, a molten thermoplastic film-forming material, as for example polyvinyl chloride, is supplied to the die 9 by a conduit 33 and is continuously extruded through the die orifice 31 as the seamless tubing 13. The freshly extruded tubing is drawn over the mandrel 15, between collapsing frames 25 and nip rolls 21 and 23, and is collected as a roll 29. As the tubing is advanced relative to the mandrel 15, it is sized or expanded to a desired diameter by the disc assemblies 51 and set or chilled to a generally solid condition by cool air or other gas delivered by the cooling rings 17 and 19. In addition, air is delivered by the pipe 69 into that portion of the tubing 13 nearest to the die 9 so as to prevent the same from collapsing under the force of the cooling medium issuing from the ring 17. Concomitantly with the extrusion operation, the conduit 61 and pump 63 deliver a mixture of air and suitable powders, as for example starch or talc powder, into that portion of the tubing 13 moving beyond the mandrel 15. Such powders serve to coat or dust the internal surface of the tubing 13 and thus prevent the same from adhering when the tubing is subsequently collapsed and collected in a flattened condition. Excess powder is collected by the funnel 65 and vented through the passage 67.

As seen in FIGURE 2 of the drawing, significant sizing of the tubing occurs as the freshly extruded tubing 13 travels from the die orifice 31 to the first of the series of mandrel disc assemblies 51. The remaining disc assemblies are essential, however, since they assist in completing the sizing of the tubing and maintain the tubing in its sized condition until it is substantially set. It is made clear that sizing of the tubing 13 is effected primarily by the disc assemblies 51 and that no reliance is placed upon the gaseous medium delivered by the pipe 69 for achieving this particular function.

The mandrel disc assemblies 51 are of the same construction, each including an annular sheet or fabric piece 71 and a pair of rigid metallic supporting plates 73. The plates 73 must not engage with the tubing wall, yet must be of such diameter as to support the fabric piece 71, as shown in FIGURE 2, with its peripheral edge engaged with the internal surface of the tubing 13. The diameter of the fabric piece 71 will vary with such factors as the fabric thickness and diameter or support provided by the discs 73. Satisfactory sizing of the tubing has been achieved by employing disc assemblies in which the fabric piece 71 is about one-eighth of an inch larger than the desired diameter of the tubing being formed while the metallic discs are about one-eighth inch smaller than such tubing diameter.

The fabrics pieces 71 of the disc assemblies 51 are formed of materials which do not soften under the particular elevated temperature employed and which possess sufficient strength to withstand continuous rubbing engagement with the tubing wall. Disc assemblies 51 having annular sheets or fabric pieces 71 formed of natural and/or synthetic fibers, as for example wool and "Teflon" fibers, are satisfactory providing the tubing 13 is cooled to such a degree as to prevent the same from sticking to or grabbing with the fabric pieces. It is preferred, however, that the annular sheets or fabric pieces 71 be formed of inorganic refractory materials, such as asbestos, glass, and slag or mineral fibers. Such annular sheets or fabric pieces 71 possess the necessary characteristics as heretofore noted and permit high speed production without the need of complicated and expensive air cooling equipment.

The number and spacing of the disc assemblies can be varied to suit particular operating conditions. Essentially, an adequate number of disc assemblies 51 should be provided to support the tubing 13 while it is still in a plastic and formative condition. Further, such assemblies should be positioned sufficiently close so as to prevent deformation of the tubing as it travels between adjacent assemblies.

As heretofore mentioned, the mandrel 15 may be periodically or continuously oscillated about its longitudinal axis by a reversible motor through meshing gears 57 and 59. Such movement of the mandrel 15 imparts a similar movement to the tubing 13 simultaneously with its continuous advancement relative to the mandrel. As a result of such oscillation of the tubing 13, as it travels toward and between the collapsing frames 25, the longitudinal fold lines formed by the nip rolls 21 and 23 occur along successively different longitudinal elements of the tubing wall so that successive convolutes of such elements of the tubing are laterally offset from each other in the roll 29.

It will, of course, be understood that the teachings of the present invention are useful with a variety of thermoplastic film-forming materials and operating conditions. Further, while the apparatus has been illustrated as employed in extruding tubing in a upward direction, the apparatus can be positioned for extruding a tubing in a horizontal or other direction with equally satisfactory results.

It is to be understood that changes and variations may be made without departing from the spirit and scope of the invention as defined in the appended claims.

I claim:

1. Apparatus for producing a thin-walled tubing including an annular die, means for extruding molten thermoplastic material through said die in the form of a continuous seamless tubing having longitudinally extending elements which differ in thickness, means for continuously withdrawing the tubing away from the point of extrusion, means for cooling the extruded tubing after it leaves said die, means for collapsing the tubing into a flattened condition, means for collecting the flattened tubing in the form of a roll, a mandrel located beyond said die for engaging with the internal surface of the extruded tubing and expanding the same to a desired size as it is advanced thereover, and means for oscillating said mandrel to thereby effect similar oscillation of the extruded tubing about its longitudinal axis whereby successive convolutes of an element of the tubing are laterally offset from each other on said roll.

2. Apparatus for producing a thin-walled tubing including an annular die, means for extruding molten thermoplastic material through said die in the form of a continuous seamless tubing having longitudinally extending elements which differ in thickness, means for continuously withdrawing the tubing away from the point of extrusion, means for cooling the extruded tubing after it leaves said die, means for collapsing the tubing into a flattened condition, means for collecting the flattened tubing in the form of a roll, a mandrel located beyond said die for expanding the extruded tubing to a desired size as it is advanced thereover, and means for oscillating said mandrel to thereby effect similar oscillation of the extruded tubing about its longitudinal axis whereby successive convolutes of an element of the tubing are laterally offset from each other on said roll, said mandrel including a conduit extending through and beyond said die and annular disc assemblies fixed to said conduit at longitudinally spaced intervals thereof, said disc assemblies each including a pair of annular plates which are of smaller diameter than the desired diameter of the finished tubing, and a flexible nonmetallic sheet interposed between each pair of plates and projecting beyond the edges thereof for engaging with the internal surface of the tubing.

3. Apparatus as defined in claim 2 wherein said sheet is a fabric piece formed of inorganic refractory material.

4. Apparatus as defined in claim 2 wherein said sheet is a fabric piece formed of asbestos.

5. Apparatus as defined in claim 2 wherein said mandrel further includes a second conduit of smaller diameter than said first mentioned conduit, said second conduit being positioned within and concentrically of said first mentioned conduit, means for delivering gas suspended powders into the tubing through one of said conduits and means on the other of said conduits for removing excess powders from the extruded tubing.

6. Apparatus for producing a thin-walled tubing including an annular die, means for extruding molten thermoplastic material through said die in the form of a continuous seamless tubing, means for continuously withdrawing the tubing away from the point of extrusion, means for cooling the extruded tubing after it leaves said die, means for collapsing the tubing into a flattened condition, and a mandrel engaging with and projecting from said die, said mandrel including a central support and a plurality of disc assemblies fixed to said support at longitudinally spaced intervals thereof, said disc assemblies each including a pair of annular plates which are of smaller diameter than the desired inside diameter of the finished tubing, and a flexible fabric piece disposed between and projecting beyond the annular edges of said plates and into engagement with the internal surface of the tubing.

7. Apparatus as defined in claim 6 wherein said fabric piece is formed of inorganic refractory materials.

8. Apparatus as defined in claim 6 wherein said fabric piece is formed of asbestos.

9. Apparatus as defined in claim 6 wherein the central support of said mandrel includes a pair of concentric but laterally spaced conduits, means for delivering gas suspended powders within the tubing through one of said conduits and means connected with the other of said conduits for removing excess powders from the tubing.

10. Apparatus as defined in claim 9 further including means for rotating said mandrel.

11. A mandrel for use in expanding a freshly extruded seamless tubing, said mandrel including a central support and a plurality of disc assemblies fixed to said central support at longitudinally spaced intervals thereof, said disc assemblies each including a pair of annular plates and a flexible asbestos sheet interposed between and projecting beyond the annular edges of said plates.

12. Apparatus for providing thin-walled tubing including an annular die, means for extruding a flowable film-forming material through said die in the form of a continuous seamless tubing having longitudinally extending elements which differ in thickness, a mandrel spaced from said die, means for continuously withdrawing the extruded tubing from said die and over said mandrel, and means for effecting a partial set of the extruded tubing as it travels from said die, said mandrel including at least one sheet of non-metallic material for engaging with the internal surface of the extruded tubing and expanding the same to a desired size, said sheet being flexible along its peripheral portion and having a diameter which is at least equal to the internal diameter which is desired in the finished tubing.

13. Apparatus as defined in claim 12 wherein a plurality of said non-metallic sheets are located at longitudinally spaced intervals along the length of said mandrel, and wherein said sheets are of a diameter slightly larger than the internal diameter desired in the finished tubing.

14. Apparatus as defined in claim 13 wherein said sheets are formed of inorganic refractory materials.

15. Apparatus for extruding a tubular plastic film comprising an extrusion die having a tubular orifice and a mandrel which includes a central support and a plurality of disc assemblies positioned at spaced intervals along the length thereof, said disc assemblies each including a pair of rigid annular plates and a flexible, non-metallic sheet interposed between such pair of plates and projecting beyond the edges thereof, said flexible sheets each being of greater diameter than said tubular orifice, said mandrel being supported by said die and being positioned within the tubular film extruded through said orifice, the internal surface of said tubular film contacting the external surfaces of the flexible sheets of said disc assemblies.

16. Apparatus for extruding a tubular plastic film comprising an extrusion die having a tubular orifice and a mandrel; said mandrel being supported by said die and being positioned within the tubular film extruded through said tubular orifice; the internal surface of said tubular film contacting the external surface of said mandrel; and means for moving said mandrel about the axis of said tubular film and carrying said tubular film therewith.

17. Apparatus for extruding a tubular plastic film comprising an extrusion die having a tubular orifice and a mandrel having a plurality of longitudinally spaced disc assemblies, said assemblies each having projecting portions which are of greater diameter than said tubular orifice, said mandrel being supported by said die and being positioned within the tubular film extruded through said tubular orifice, the internal surface of said tubular film contacting the external surfaces of said projecting portions of the mandrel discs, and means for moving said mandrel about the axis of said tubular film and carrying said tubular film therewith.

18. Apparatus as defined in claim 17 wherein said disc assemblies each include a pair of annular plates and a flexible, non-metallic sheet interposed between each pair of plates and projecting beyond the edges thereof for engaging with the internal surface of the tubular film.

19. Apparatus as defined in claim 17 wherein said flexible non-metallic sheet is formed of inorganic refractory material.

20. Apparatus for extruding a tubular plastic film and imparting an oscillatory or rotative movement to said film comprising an extrusion die having a tubular orifice and a mandrel of greater diameter than said tubular orifice; said mandrel being supported by said die and being positioned within the tubular film extruded through said tubular orifice; the internal surface of said tubular film contacting the external surface of said mandrel; and means for moving said mandrel about the axis of said tubular film and carrying said tubular film therewith.

(References on following page)

References Cited by the Examiner

UNITED STATES PATENTS

| | | | |
|---|---|---|---|
| 1,196,648 | 8/1916 | Bleecker | 18—14 |
| 1,993,349 | 3/1935 | Parkhurst | 18—14 |
| 2,979,777 | 4/1961 | Goldman | 18—57 |
| 2,987,776 | 6/1961 | Miller | 18—57 |
| 3,017,339 | 1/1962 | Dewey | 18—14 |
| 3,059,277 | 10/1962 | Pierce et al. | 18—14 |
| 3,079,636 | 3/1963 | Aykanian | 18—14 |
| 3,085,293 | 4/1963 | Kritchever | 18—14 X |
| 3,088,167 | 5/1963 | Corbett | 18—14 |

FOREIGN PATENTS

| | | |
|---|---|---|
| 153,610 | 5/1952 | Australia. |
| 1,106,951 | 5/1961 | Germany. |
| 177,695 | 12/1961 | Sweden. |

WILLIAM J. STEPHENSON, *Primary Examiner.*

ALEXANDER H. BRODMERKEL, ROBERT F. WHITE, MICHAEL V. BRINDISI, J. SPENCER OVERHOLSER, *Examiners.*

C. B. HAMBURG, L. S. SQUIRES, *Assistant Examiners.*